(12) United States Patent
Kim et al.

(10) Patent No.: US 9,137,691 B2
(45) Date of Patent: Sep. 15, 2015

(54) METHOD AND APPARATUS FOR ESTIMATING LONG-TERM TRANSFER RATE OF TERMINAL

(71) Applicant: SNU R&DB FOUNDATION, Seoul (KR)

(72) Inventors: Seong Cheol Kim, Seoul (KR); Jeong Sik Choi, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 239 days.

(21) Appl. No.: 13/917,927

(22) Filed: Jun. 14, 2013

(65) Prior Publication Data
US 2014/0140240 A1 May 22, 2014

(30) Foreign Application Priority Data
Nov. 22, 2012 (KR) .......................... 10-2012-0133011

(51) Int. Cl.
*H04W 24/08* (2009.01)
(52) U.S. Cl.
CPC ..................................... *H04W 24/08* (2013.01)
(58) Field of Classification Search
CPC .................................................... H04W 24/08
See application file for complete search history.

(56) References Cited

U.S. PATENT DOCUMENTS

| 6,069,883 | A | * | 5/2000 | Ejzak et al. | .................... | 370/335 |
| 2003/0036361 | A1 | * | 2/2003 | Kawai et al. | .................... | 455/69 |
| 2005/0075103 | A1 | * | 4/2005 | Hikokubo et al. | ............ | 455/423 |
| 2010/0208675 | A1 | * | 8/2010 | Song et al. | .................... | 370/329 |
| 2012/0026910 | A1 | | 2/2012 | Ko et al. | ...................... | 370/252 |

FOREIGN PATENT DOCUMENTS

| KR | 10-2007-0000807 | 1/2007 | ............. | H04L 12/56 |
| KR | 10-2012-0012618 | 2/2012 | ............ | H04W 72/12 |

OTHER PUBLICATIONS

Choi, et al. (2012) "User throughput estimation for the PF scheduling algorithm under MIMO channel environments."*IEEE Wireless Communications Letters*, 1(5):528-531.
Office Action dated Feb. 25, 2014, issued in Korean Application No. KR 10-2012-0133011 and English language summary of the gist of Office Action.

* cited by examiner

*Primary Examiner* — Jay P Patel
(74) *Attorney, Agent, or Firm* — Harness, Dickey & Pierce, P.L.C.

(57) ABSTRACT

A method and an apparatus for estimating a long-term transfer rate of a terminal are provided. The method for estimating the long-term transfer rate includes: calculating a burst transfer rate of each pilot signal which is transmitted from a base station to a target terminal to calculate a long-term transfer rate; and calculating a long-term transfer rate of the target terminal using distribution of the calculated burst transfer rates and the number (N) of terminals that are serviced by the base station.

20 Claims, 10 Drawing Sheets

METHOD AND APPARATUS FOR ESTIMATING LONG-TERM TRANSFER RATE OF TERMINAL

CROSS-REFERENCE TO RELATED PATENT APPLICATION

This application claims priority from Korean Patent Application No. 10-2012-0133011, filed on Nov. 22, 2012, in the Korean Intellectual Property Office, the disclosure of which is incorporated herein by reference in its entirety.

FIELD

Apparatuses and methods consistent with the exemplary embodiments relate to estimating a long-term transfer rate of a terminal, and more particularly, to estimating a long-term transfer rate that each terminal may have if a base station provides services to terminals using a proportional fair scheduling algorithm.

BACKGROUND

In a cellular communication system, a base station provides services to a plurality of terminals linked therewith using a proportional fair scheduling algorithm. The term 'service' means an action that the base station takes in order to transmit radio data packets to each terminal. If the base station provides services to each terminal using a related-art proportional fair scheduling algorithm, a transfer rate is estimated mainly in a single antenna system. If a linkage between the base station and each terminal has a Rayleigh fading channel and a burst transfer rate is a linear function of the signal to noise ratio (SNR), the long-term transfer rate is calculated using the following equation 1:

$$R = \frac{1}{N} G(N) E[r] \quad \text{[Equation 1]}$$

wherein R is a long-term transfer rate, N is the number of terminals linked with a base station simultaneously, $$G(N) = 1 + \frac{1}{2} + \ldots + \frac{1}{N}$$

is a multi-user gain, and E[r] is a mean transfer rate between a base station and a specific terminal. However, [Equation 1] is applied to only the single antenna system and cannot be extended to a multiple antenna system. Also, if the burst transfer rate is not a liner function of the SNR in a real single antenna system, many errors may occur in estimating a long-term transfer rate and thus it is difficult to calculate an exact value.

SUMMARY

One or more aspects of the exemplary embodiments provide a method and an apparatus for estimating a long-term transfer rate of a terminal, which are effective in both a single antenna system and a multiple antenna system, and which can estimate a long-term transfer rate of a plurality of terminals more exactly even if a burst transfer rate is not a linear function of an SNR.

According to an aspect of an exemplary embodiment, there is provided a method for estimating a long-term transfer rate of a terminal, the method including: calculating a burst transfer rate of each pilot signal which is transmitted from a base station to a target terminal to calculate a long-term transfer rate; and calculating a long-term transfer rate of the target terminal using distribution of the calculated burst transfer rates and the number (N) of terminals which are serviced by the base station.

The calculating the long-term transfer rate may include: selecting a temporary transfer rate based on the distribution of the burst transfer rates using a temporary transfer rate selection function; and calculating the long-term transfer rate by dividing the selected temporary transfer rate by the number (N) of terminals.

The temporary transfer rate selection function may be defined by following equation:

$$\text{temporary transfer rate selection function} = F_{R_A}^{-1}(Z)$$

wherein $R_A$ is a random variable indicating a change in burst transfer rates of a target terminal (A), $F_{R_A}(\cdot)$ is a cumulative distribution function of the random variable ($R_A$), and $F_{R_A}^{-1}(\cdot)$ is an inverse function of $F_{R_A}(\cdot)$. The temporary transfer rate selection function may be a function that selects a value that makes a cumulative distribution function value of the burst transfer rates be Z, and the Z may be a variable that increases in proportion to the number (N) of terminals and may have a value ranging from 0 to 1.

The selecting may include: re-arranging the calculated burst transfer rates in a predetermined order and mapping index numbers onto the re-arranged burst transfer rates; calculating an index number for selecting the temporary transfer rate using the number (N) of terminals and the number of calculated burst transfer rates; and selecting a burst transfer rate that is mapped onto the calculated index number from among the re-arranged burst transfer rates as the temporary transfer rate.

The calculating the index number may calculate the index number using following equation:

$$\text{Index number} = \lceil Z \times N_{TS} \rceil$$

wherein $N_{TS}$ is the number of calculated burst transfer rates or a greatest value of the index number, Z may be defined by following equation:

$$Z = \frac{N}{N+k}$$

wherein k is a variable that varies according to a communication service state between a base station and the target terminal.

The calculating the burst transfer rate and the calculating the long-term transfer rate may be all performed in the base station.

The target terminal may receive information on the number (N) of terminals serviced by the base station from the base station, and the calculating the burst transfer rate and the calculating the long-term transfer rate may be all performed in the target terminal.

The calculating the burst transfer rate may be performed in the target terminal and the calculating the long-term transfer rate may be performed in the base station using the burst transfer rates calculated in the target terminal.

According to an aspect of another exemplary embodiment, there is provided an apparatus for estimating a long-term transfer rate of a terminal, the apparatus including: a burst transfer rate calculator which calculates a burst transfer rate of each pilot signal which is transmitted from a base station to a target terminal to calculate a long-term transfer rate; and a long-term transfer rate calculator which calculates a long-term transfer rate of the target terminal using distribution of the calculated burst transfer rates and the number of terminals (N) which are serviced by the base station.

The long-term transfer rate calculator may select a temporary transfer rate based on the distribution of the burst transfer rates calculated by the burst transfer rate calculator using a temporary transfer rate selection function, and may calculate the long-term transfer rate by dividing the selected temporary transfer rate by the number (N) of terminals.

The temporary transfer rate selection function may be defined by following equation:

$$\text{temporary transfer rate selection function} = F_{R_A}^{-1}(Z)$$

wherein $R_A$ is a random variable indicating a change in burst transfer rates of a target terminal (A), $F_{R_A}(\cdot)$ is a cumulative distribution function of the random variable ($R_A$), and $F_{R_A}^{-1}(\cdot)$ is an inverse function of $F_{R_A}(\cdot)$. The temporary transfer rate selection function may be a function that selects a value that makes a cumulative distribution function value of the burst transfer rates be Z, and the Z may be a variable that increases in proportion to the number (N) of terminals serviced by the base station and may have a value ranging from 0 to 1.

The long-term transfer rate calculator may include: an arrangement unit which re-arranges the calculated burst transfer rates in a predetermined order and maps index numbers onto the re-arranged burst transfer rates; an index calculator which calculates an index number for selecting the temporary transfer rate using the number (N) of terminals and the number of calculated burst transfer rates; and a temporary transfer rate selector which selects a burst transfer rate that is mapped onto the calculated index number from among the re-arranged burst transfer rates as the temporary transfer rate.

The index calculator calculates the index number using following equation:

$$\text{Index number} = [Z \times N_{TS}]$$

wherein $N_{TS}$ is the number of burst transfer rates calculated by the burst transfer rate calculator or a greatest value of the index number, Z is defined by following equation:

$$Z = \frac{N}{N+k}$$

wherein k is a variable that varies according to a communication service state between the base station and the target terminal.

The long-term transfer rate calculator may select a great burst transfer rate from among the burst transfer rates as the temporary transfer rate, as the number of terminals increases.

According to an aspect of still another exemplary embodiment, there is provided an apparatus for estimating a long-term transfer rate of a terminal, which includes a computer processor, a memory, and a program logic which is loaded into the memory and executable under the control of the computer processor, wherein the program logic performs the method as claimed in any one of claims 1 to 8.

Unlike in a related-art method, the method for estimating the long-term transfer rate according to an exemplary embodiment can be applied to a multi-antenna system as well as a single antenna system, and, even if burst transfer rates of each terminal are greatly changed, the long-term transfer rate can be exactly estimated.

Also, a related-art method estimates a long-term transfer rate only if a channel between a base station and a terminal is a Rayleigh fading channel and also if a burst transfer rate is a linear function of SNR. However, according to an exemplary embodiment, even if a burst transfer rate is not a linear function of SNR, a long-term transfer rate can be estimated and a minimum error occurs in estimating the long-term transfer rate. Also, even if the channel between the base station and the terminal is not a Rayleigh fading channel, the long-term transfer rate can be estimated. Therefore, the method and apparatus according to an exemplary embodiment can be applied to various fields.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which.

11A and 11B are views to explain apparatuses for estimating a long-term transfer rate of a target terminal according to a fifth exemplary embodiment and a sixth exemplary embodiment.

DETAILED DESCRIPTION

Figure 1:
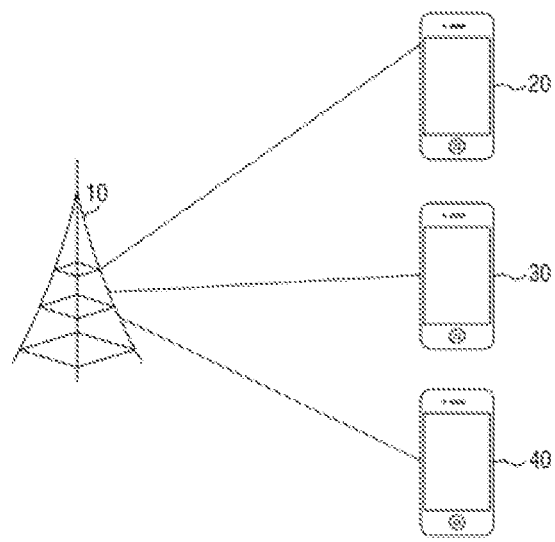
FIG. 1 is a view illustrating a system to which an apparatus for estimating a long-term transfer rate of a terminal according to an exemplary embodiment is applied.

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" another element, the element can be directly on another element or intervening elements.

If the terms such as 'first' and 'second' are used to describe elements, these element should not be limited by such terms. These terms are used for the purpose of distinguishing one element from another element only. The exemplary embodiments include their complementary embodiments.

Also, it will be understood that when a first element (or first component) is referred to as being operated or executed "on" a second element (or second component), the first element (or first component) can be operated or executed in an environment where the second element (second component) is operated or executed or can be operated or executed by interacting with the second element (second component) directly or indirectly.

Also, it will be understood that when an element, component, apparatus or system is referred to as comprising a component consisting of a program or software, the element, component, apparatus or system can comprise hardware (for example, a memory or a central processing unit (CPU)) necessary for executing or operating the program or software or another program or software (for example, a operating system (OS), a driver necessary for driving a hardware), unless the context clearly indicates otherwise.

Also, it will be understood that an element (or component) can be realized by software, hardware, or software and hardware, unless the context clearly indicates otherwise.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprise" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

DEFINITION

For the purpose of explaining the present disclosure, the term 'channel state information' is defined as including a 'burst transfer rate' and/or 'information for calculating a burst transfer rate' in the present specification.

FIG. 1 is a view illustrating a system to which an apparatus for estimating a long-term transfer rate of a terminal according to an exemplary embodiment is applied.

Referring to FIG. 1, the system may include a base station 10 and terminals 20, 30, and 40. The base station 10 provides services to the terminals 20, 30, and 40 linked with the base station 10 simultaneously, using a proportional fair scheduling algorithm.

The proportional fair scheduling algorithm is an algorithm for the base station to select a terminal that has a greatest ratio of an amount of data received by the terminals 20, 30, and 40 from the base station 10 and a current burst transfer rate, when providing services to the terminals 20, 30, and 40 linked therewith. The proportional fair scheduling algorithm is used as a standard algorithm in various communication systems such as high data rate (HDR) and high speed downlink packet access (HSDPA).

In particular, if the base station 10 is linked with the plurality of terminals 20, 30, and 40 simultaneously, that is, if the base station 10 provides services to two or more terminals 20, 30, and 40, the base station 10 provides service to one terminal in one time slot.

In this case, the terminals 20, 30, and 40 grasp their respective channel states in each time slot, and transmit information on the grasped channel states (hereinafter, referred to as 'channel state information') to the base station 10 through an upstream link.

According to one or more exemplary embodiments, a long-term transfer rate may be calculated based on i) a distribution of burst transfer rates, e.g., a cumulative distribution, which are calculated based on the channel state information grasped by the base station and the terminal or are included in the channel state information, and ii) the number of terminals serviced by the base station. The long-term transfer rate may be calculated by the base station and/or the terminal, and the calculated long-term transfer rate may be applied to an apparatus that can achieve hand-over or a load balance between base stations.

Referring back to FIG. 1, the base station 10 provides service to one terminal, for example, the terminal 20 in a current time slot, and simultaneously, transmits pilot signals to the terminals 20, 30, and 40 including the terminal 20.

According to a first exemplary embodiment and a second exemplary embodiment, an apparatus 100 or 200 for estimating a long-term transfer rate of a terminal may estimate a long-term transfer rate of each terminal 20, 30, or 40 using burst transfer rates which are calculated based on the pilot signals received by each terminal 20, 30, and 40 in each time slot.

The base station 10 performs an operation associated with communication services such as determining whether to perform handover with reference to the long-term transfer rate estimated for each of the terminals 20, 30, and 40.

The apparatus for estimating the long-term transfer rate according to one or more exemplary embodiments may include a long-term transfer rate calculator and a burst transfer rate calculator. Each of the burst transfer rate calculators may be located in the terminal and the base station, respectively, and makes signals between them be transmitted correctly by using the same modulation and coding scheme. Generally, the terminal calculates a burst transfer rate based on the pilot signal received from the base station, and the base station calculates a burst transfer rate based on the channel state information received from the terminal.

The long-term transfer rate calculator may be located in the terminal or the base station. For example, as in the exemplary embodiment of FIG. 2, the long-term transfer rate calculator may be located in the base station 10, or as in the exemplary embodiment of FIG. 6, the long-term transfer rate calculator may be located in the terminal. If the long-term transfer rate calculator is located in the terminal, the terminal should additionally receive information on the number of terminals that are currently serviced by the base station (that is, the number of terminals linked with the base station simultaneously).

According to the first exemplary embodiment, the terminals 20, 30, and 40 calculate burst transfer rates of signals based on the pilot signals received in each time slot, and include the calculated burst transfer rates in the channel state information and transmit the channel state information to the base station 10. After that, the base station 10 may calculate a burst transfer rate using the channel state information.

Each of the terminals 20, 30, and 40 may calculate the burst transfer rates for a predetermined time. The predetermined time recited herein consists of one or more time slots, and the burst transfer rate may be calculated in each of at least one of time slots constituting the predetermined time. For example, the burst transfer rate may be calculated in each of the time slots constituting the predetermined time. If the predetermined time consists of 10 time slots in total, the burst transfer rate may be calculated in some (e.g., only 5 time slots) of the total time slots.

The base station 10 may calculate a burst transfer rate using the channel state information received from the terminals 20, 30, and 40, and may map the burst transfer rate onto each time slot and may store the burst transfer rate. i) If the channel state information received from the terminals 20, 30, and 40 includes the burst transfer rate, the base station 10 uses the burst transfer rate included in the channel state information, but, ii) if the channel state information includes data for calculating the burst transfer rate, the base station 10 calculates the burst transfer rate using this data.

The base station 10 according to the first exemplary embodiment may receive the channel state information including the burst transfer rate or data for calculating the burst transfer rate from each of the terminals 20, 30, and 40, and estimates the long-term transfer rate of the terminals 20, 30, and 40 using the burst transfer rate or data for calculating the burst transfer rate, which is included in the channel state information received from the terminals 20, 30, and 40.

The base station according to the first exemplary embodiment may estimate the long-term transfer rate of each terminal 20, 30, and 40 using a distribution of the burst transfer rates of the terminals 20, 30, and 40, for example, a cumulative distribution function (CDF), and the number of terminals 20, 30, and 40 (that is, the number of terminals to which a proportional fair scheduling algorithm is applied).

According to the second exemplary embodiment, the base station 10 may estimate a long-term transfer rate of each of the terminals 20, 30, and 40 using the burst transfer rates of each of the terminals 20, 30, and 40, the number of calculated burst transfer rates, and the number of terminals 20, 30, and 40.

According to third and fourth exemplary embodiments, the terminals 20, 30, and 40 may calculate burst transfer rates of signals based on pilot signals received from the base station, and estimate their respective long-term transfer rates using the calculated burst transfer rates. Each of the terminals 20, 30, and 40 may calculate the burst transfer rates for a predetermined time, and may estimate the long-term transfer rate based on the calculated burst transfer rates. The predetermined time may be a time that is required to estimate the long-term transfer rate, and may be appropriately selected by an ordinary skilled person in the related art.

In the present exemplary embodiment in which the terminal estimates the long-term transfer rate, the base station is required to inform the terminal, which intends to estimate the long-term transfer rate, of the number of terminals serviced by the base station. For example, the base station may inform the terminal, which intends to estimate the long-term transfer rate, of the number of terminals serviced by the base station periodically or frequently (e.g., when the number of terminals serviced by the base station is changed). The base station may include information on the number of terminals in the pilot signal.

According to a third exemplary embodiment, the terminals 20, 30, and 40 estimate their respective long-term transfer rates using the cumulative distribution function of their burst transfer rates and the number of terminals 20, 30, and 40.

According to a fourth exemplary embodiment, the terminals 20, 30, and 40 estimate their respective long-term transfer rates using their burst transfer rates, the number of calculated burst transfer rates, and the number of terminals 20, 30, and 40.

For the third and fourth exemplary embodiments, the apparatus 300 or 400 for estimating the long-term transfer rate of the terminal is located in each of the terminals 20, 30, and 40 and calculates the burst transfer rate and estimate the long-term transfer rate.

Hereinafter, an apparatus 100 for estimating a long-term transfer rate of a terminal according to the first exemplary embodiment will be explained with reference to FIGS. 1 and 2. In this exemplary embodiment, a long-term transfer rate of the terminal 20 (hereinafter, referred to as a target terminal) from among the terminals 20, 30, and 40 is estimated for example.

Figure 2:
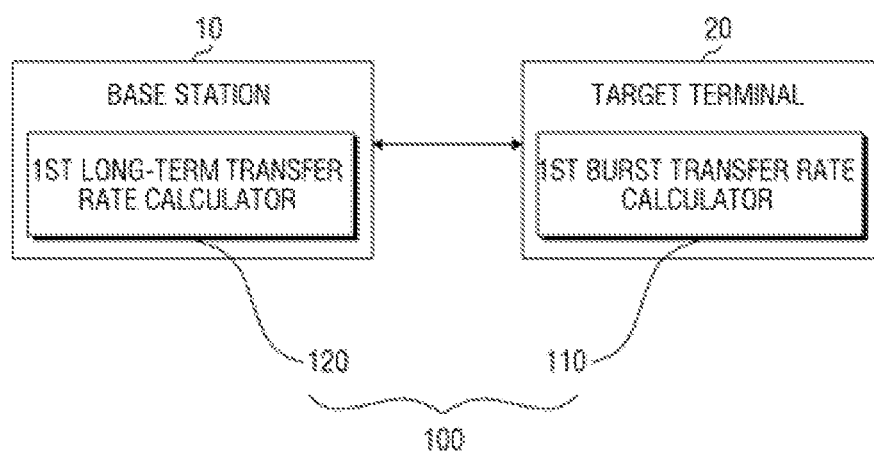
FIG. 2 is a block diagram to explain an apparatus for estimating a long-term transfer rate of a target terminal according to a first exemplary embodiment.

FIG. 2 is a block diagram illustrating an apparatus 100 for estimating a long-term transfer rate of a target terminal 20 according to the first exemplary embodiment.

Referring to FIG. 2, the apparatus 100 for estimating the long-term transfer rate of the target terminal 20 includes a first burst transfer rate calculator 110, a first long-term transfer rate calculator 120, and a channel state information transmitter 130.

The first burst transfer rate calculator 110 is located in the target terminal 20 and calculates at least one burst transfer rate for a predetermined time. For example, if the base station 10 should provide services to the terminals 20, 30, and 30 linked therewith simultaneously, the base station 10 may provide service such as data transmission to one terminal in one time slot. The base station 10 transmits pilot signals to the terminals 20, 30, and 40 to grasp a channel state in each time slot. For example, the first burst transfer rate calculator 110 calculates a burst transfer rate based on the pilot signal received in each time slot of the predetermined time, and maps the calculated burst transfer rate onto an index of the time slot, and the channel state information transmitter 130 of the target terminal 20 transmits the burst transfer rate which is mapped onto the index of the time slot to the base station 10 as channel state information of the target terminal 20.

The base station 10 stores the burst transfer rates received from the target terminal 20 in a storage (not shown) along with the mapped index of the time slot. If a predetermined number of burst transfer rates are received from the target terminal 20, the base station 10 loads the first long-term transfer rate calculator 120 into a memory (see FIG. 11) and controls it to operate. For example, the first long-term transfer rate calculator 120 may be stored in a non-volatile memory (see FIG. 11) of the base station 10 in an executable form, and may be loaded into the memory and executed under the control of a central processing unit (CPU) or a processor.

The first long-term transfer rate calculator 120 may calculate the long-term transfer rate of the target terminal 20 using cumulative distribution of the burst transfer rates calculated for the predetermined time, and the number of terminals 20, 30, and 40 serviced by the base station 10.

The first long-term transfer rate calculator 120 selects one of the burst transfer rates received from the target terminal 20 as a temporary transfer rate using a temporary transfer rate selection function, and estimates the long-term transfer rate of the target terminal 20 by dividing the selected temporary transfer rate by the number of terminals 20, 30, and 40.

[Equation 2] is used for the first long-term transfer rate calculator 20 to estimate the long-term transfer rate of the target terminal 20:

$$R'_A = \frac{1}{N} F_{R_A}^{-1}(Z)$$ [Equation 2]

wherein $F_{R_A}(\cdot)$ is a cumulative distribution function of burst transfer rates calculated by a target terminal for a predetermined time, and $F_{R_A}^{-1}(\cdot)$ is an inverse function of the cumulative distribution function. Accordingly, in [Equation 2], $F_{R_A}^{-1}(Z)$ is an inverse function ($F_{R_A}^{-1}(\cdot)$) of the cumulative distribution function ($F_{R_A}(\cdot)$) of the burst transfer rate ($R_A$) and is referred to as a temporary transfer rate selection function.

Also, RA means a random variable indicating a change in the burst transfer rate of the target terminal (A), and $F_{R_A}(\cdot)$ indicates a cumulative distribution function of the RA.

Z is variable that increases in proportion to the number of serviced terminals 20, 30, and 40 and may have a value between 0 and 1.

Figure 3:
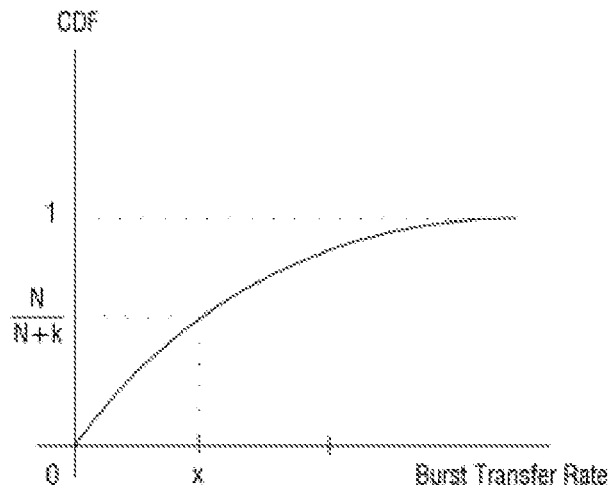
FIG. 3 is a graph showing a cumulative distribution function of burst transfer rates calculated in the target terminal.

FIG. 3 is a graph showing a cumulative distribution function of burst transfer rates calculated in the target terminal 20.

Referring to FIG. 3 and [Equation 2], the first long-term transfer rate calculator 120 observes a change in the burst transfer rates of the target terminal 20 for a predetermined time and then selects a temporary transfer rate of the target terminal 20. For example, the first long-term transfer rate calculator 120 may select a burst transfer rate 'x', which makes a resulting value of the cumulative distribution function be Z, as a temporary transfer rate of the target terminal 20.

The first long-term transfer rate calculator 120 estimates and calculate a long-term transfer rate of the target terminal 20 by dividing the temporary transfer rate selected by the temporary transfer rate selection function of [Equation 2] by the number of terminals 20, 30, and 40.

In FIG. 3, the cumulative distribution function of the burst transfer rates is depicted smoothly and specifically. However, if the cumulative distribution function of the burst transfer rates is not smooth and specific, the apparatus 100 for estimating the long-term transfer rate of the target terminal 20 may not know exactly the burst transfer rate that makes the resulting value of the cumulative distribution function be Z. In this case, the long-term transfer rate may be estimated in an alternative method according to the second exemplary embodiment.

Figure 4:
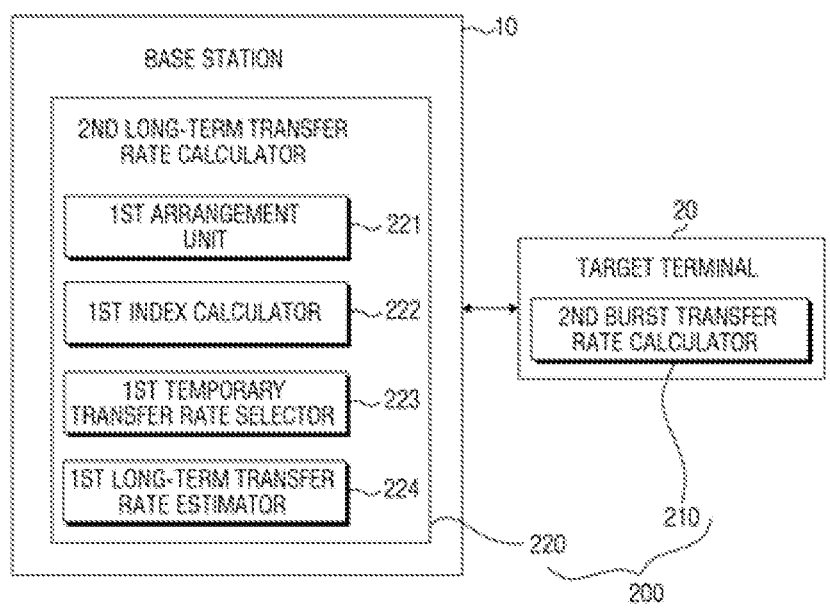
FIG. 4 is a block diagram to explain an apparatus for estimating a long-term transfer rate of a target terminal according to a second exemplary embodiment.

FIG. 4 is a block diagram illustrating an apparatus 200 for estimating a long-term transfer rate of a target terminal 20 according to the second exemplary embodiment.

Referring to FIG. 4, the apparatus 200 for estimating the long-term transfer rate of the target terminal 20 includes a second burst transfer rate calculator 210, a second long-term transfer rate calculator 220, and a second channel state information transmitter 230.

The second burst transfer rate calculator 210 is located in the target terminal 20 and calculates burst transfer rates based on pilot signals received for a predetermined time.

The second burst transfer rate calculator 210 is the same as the first burst transfer rate calculator 110 explained above with reference to FIG. 2 and thus a detailed description thereof is omitted.

The second channel state information transmitter 230 transmits the calculated burst transfer rate to the base station 10 as channel state information every time that the second burst transfer rate calculator 210 calculates the burst transfer rate.

The base station 10 stores the burst transfer rates received from the target terminal 20 in a storage (not shown). If the burst transfer rates are received from the target terminal 20 and stored, the base station 10 loads the second long-term transfer rate calculator 220 into a memory (not shown) and control it to operate. The burst transfer rates received for the predetermined time may be the burst transfer rates that are calculated based on the pilot signal included in each of the time slots constituting the predetermined time.

In the present exemplary embodiment, the second long-term transfer rate calculator 220 selects one of the burst transfer rates as a temporary transfer rate and calculates the long-term transfer rate of the target terminal 20 using the selected temporary transfer rate and the number of terminals 20, 30, and 40 serviced by the base station 10. According to an exemplary embodiment, the more the number of terminals simultaneously linked with the base station 10, the bigger burst transfer rate from among the burst transfer rates received from the target terminal 20 will be selected as the temporary transfer rate by the second long-term transfer rate calculator 220.

The second long-term transfer rate calculator 220 may include a first arrangement unit 221, a first index calculator 222, a first temporary transfer rate selector 223, and a first long-term transfer rate estimator 224.

The first arrangement unit 221 re-arranges the burst transfer rates calculated in the plurality of time slots in an ascending order (or a descending order), and maps index numbers onto the re-arranged burst transfer rates in sequences. Hereinafter, the case in which the burst transfer rates are arranged in the ascending order will be explained by way of an example. However, this is merely an example and it should be understood by an ordinary skilled person in the related art that the present disclosure is not limited to the arrangement in the ascending order.

Figure 5A:
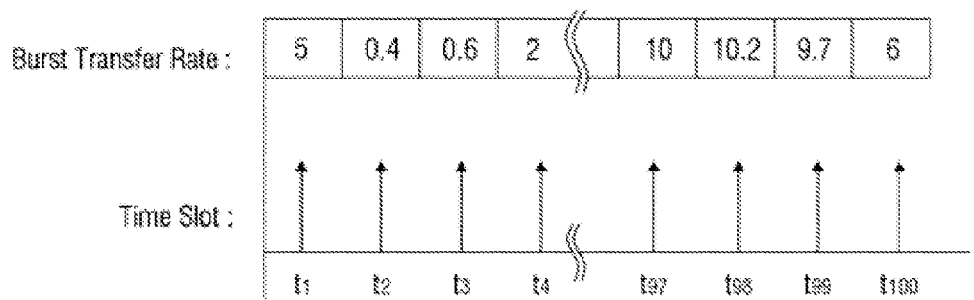
FIG. 5A is a view showing an example of a burst transfer rate which is calculated in each time slot.
Figure 5B:
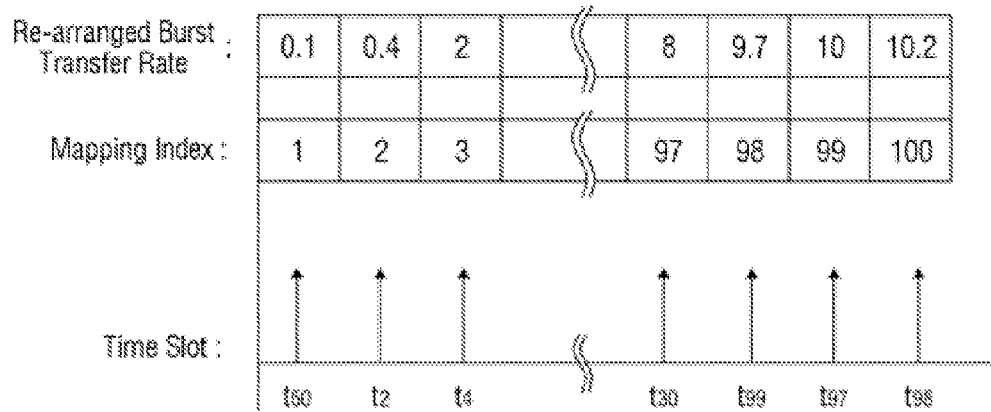
FIG. 5B is a view showing an example of burst transfer rates which are rearranged in an ascending order.

FIG. 5A is a view showing an example of a burst transfer rate calculated in each time slot, and FIG. 5B is a view showing an example of burst transfer rates re-arranged in an ascending order.

Referring to FIG. 5A, if 100 pilot signals are received from the base station 10 through 100 time slots, the target terminal 20 calculates a burst transfer rate for each pilot signal. For example, it can be seen that the burst transfer rate of the pilot signal received at the first time slot (t1) is 5 and the burst transfer rate of the pilot signal received at the 100th time slot (t100) is 6.

Referring to FIG. 5B, the first arrangement unit 221 re-arranges the burst transfer rates calculated as shown in FIG. 5A in the ascending order, and maps index numbers 1 to 100 onto the rearranged burst transfer rates in sequence. Accordingly, index number 1 is mapped onto 0.1 which is the smallest burst transfer rate calculated in the 50th time slot (t50) from among the 100 burst transfer rates calculated in the 100 time slots, and index number 100 is mapped onto 10.2 which is the biggest burst transfer rate calculated in the 98th time slot (t98).

The first index calculator 222 may calculate an index number for selecting a temporary transfer rate. For example, the first index calculator 111 calculates the index number for selecting the temporary transfer rate using the number of terminals 20, 30, and 40 linked with the base station 10 simultaneously and serviced by the base station 10 and the number of burst transfer rates (herein, the number of time slots). The first index calculator 222 may calculate the index number using [Equation 3]:

$$\text{Index number} = \lceil Z \times N_{TS} \rceil \qquad [\text{Equation 3}]$$

wherein $N_{TS}$ refers to the number of calculated burst transfer rates or the greatest index number, Z is a variable that increases in proportion to the number of terminals serviced by the base station 10 and has a value between 0 and 1, and $\lceil \ \rceil$ refers to a roundup function.

For example, as the number of terminals increases, Z increases. Accordingly, a great burst transfer rate from among the burst transfer rates may be selected as the temporary burst transfer rate.

According to an exemplary embodiment, Z included in [Equation 2] or [Equation 3] may be defined by following [Equation 4], but it should be understood by an ordinary skilled person in the related art that Z is not limited to [Equation 4].

$$Z = \frac{N}{N+k} \qquad [\text{Equation 4}]$$

wherein N is the number of terminals 20, 30, and 40 linked with the base station 10, and k is a variable that varies according to a communication service state of the base station 10 or the target terminal 20 or an indeterminate constant.

The number of burst transfer rates calculated for the predetermined time corresponds to the number of time slots in which the burst transfer rates are calculated from among the time slots constituting the predetermined time. If the target terminal 20 calculates the burst transfer rates for all of the time slots constituting the predetermined time, the number of burst transfer rates calculated for the predetermined time is the same as the number of time slots constituting the predetermined time.

Referring to [Equation 3], if $Z \times N_{TS}$ has a decimal point, the first index calculator 222 calculates an integer larger than $Z \times N_{TS}$ as an index number (that is, if $Z \times N_{TS}$ has a decimal point, $Z \times N_{TS}$ is rounded up). The function for selecting the index number as in [Equation 3] calculates the index number such that a great burst transfer rate from among the burst transfer rates calculated for the predetermined time is selected as the temporary transfer rate, as the number of terminals linked with the base station 10 simultaneously increases.

The first temporary transfer rate selector 223 selects the burst transfer rate that is mapped onto the index number calculated by the first index calculator 222 from among the rearranged burst transfer rates as the temporary transfer rate. That is, the first temporary transfer rate selector 223 selects the burst transfer rate that is mapped onto the index number calculated by [Equation 3], that is, Index number=$\lceil Z \times N_{TS} \rceil$, from among the re-arranged burst transfer rates. For example, if 3 is obtained by rounding up $Z \times N_{TS}$, the first temporary transfer rate selector 223 selects the burst transfer rate mapped onto index=3, that is, 2, from among the burst transfer rates re-arranged as shown in FIG. 5B, as the temporary transfer rate.

The first long-term transfer rate estimator 224 estimates the long-term transfer rate of the target terminal 20 using [Equation 5]:

$$R' = \frac{1}{N} \text{Data}(\lceil Z \times N_{TS} \rceil) \qquad [\text{Equation 5}]$$

wherein R' is a long-term transfer rate of the target terminal 20, and Data($\lceil Z \times N_{TS} \rceil$) is a transfer rate that is mapped onto the $\lceil Z \times N_{TS} \rceil$th index from among the re-arranged burst transfer rates, and means a temporary transfer rate selected by the first temporary transfer rate selector 223. "Data" is a vector value in which burst transfer rates of the target terminal 20 are accumulated, and may be expressed as Data=zeros(a, 1). "zeros(a, 1)" is a command to generate a zero vector of a size of a×1 (i.e., a vector having an element of 0). "Data(b)" is a bth element value, that is, a bth burst transfer rate.

Referring to [Equation 5], the first long-term transfer rate estimator 224 estimates or calculates a long-term transfer rate by dividing the temporary transfer rate selected by the first temporary transfer rate selector 223 by the number of terminals 20, 30, and 40.

According to the second exemplary embodiment, as the number of terminals 20, 30, and 40 linked with the base station 10 simultaneously increases, the apparatus 200 for estimating the long-term transfer rate of the target terminal 20 selects a great burst transfer rate from among the burst transfer rates as the temporary transfer rate. As a result, as the number of terminals 20, 30, and 40 linked with the base station 10 increases, a great long-term transfer rate is calculated.

Also, since Data($\lceil Z \times N_{TS} \rceil$) has the same value as $F_{R_A}^{-1}(Z)$ described in the first exemplary embodiment, Data($\lceil Z \times N_{TS} \rceil$) may also be used as the temporary transfer rate selection function, and a general processing of the second long-term transfer rate calculator 220 may be a detailed processing of the operation of the first long-term transfer rate calculator 120 for calculating $F_{R_A}^{-1}(Z)$.

Figure 6:
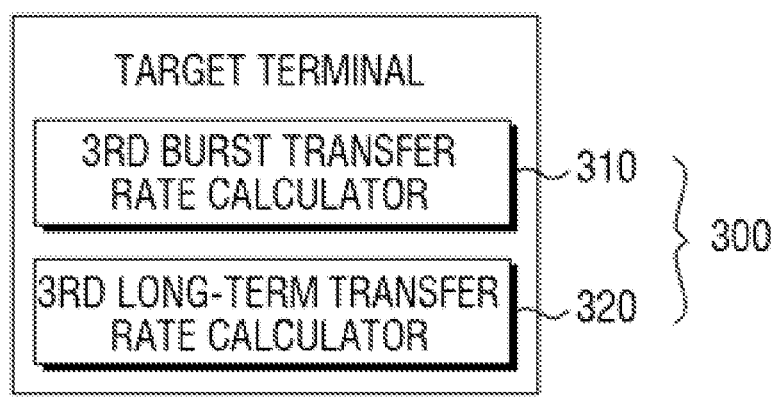
FIG. 6 is a block diagram to explain an apparatus for estimating a long-term transfer rate of a target terminal according to a third exemplary embodiment.

FIG. 6 is a block diagram illustrating an apparatus 300 for estimating a long-term transfer rate of the target terminal 20 according to a third exemplary embodiment.

Referring to FIG. 6, the apparatus 300 for estimating the long-term transfer rate of the target terminal 20 includes a third burst transfer rate calculator 310 and a third long-term transfer rate calculator 320. Since the third burst transfer rate calculator 310 and the third long-term transfer rate calculator 320 are the same as the first burst transfer rate calculator 110 and the first long-term transfer rate calculator 120 described above with reference to FIG. 2, a detailed description thereof is omitted. However, the third burst transfer rate calculator 310 and the third long-term transfer rate calculator 320 shown in FIG. 6 are located in the target terminal 20, whereas the first burst transfer rate calculator 110 of FIG. 1 is located in the target terminal 20 and the first long-term transfer rate calculator 120 is located in the base station.

Accordingly, the third burst transfer rate calculator 310 is located in the target terminal 20 and calculates a burst transfer rate of each of the pilot signals which are received from the base station 10 for a predetermined time. The third burst transfer rate calculator 310 maps an index onto each of the burst transfer rates which are calculated for the predetermined time and stores the burst transfer rates as channel state information.

According to an exemplary embodiment, if the burst transfer rates are calculated for a pre-defined time and stored, the third long-term transfer rate calculator 320 may calculate a long-term transfer rate of the target terminal 20 using cumulative distribution of the calculated burst transfer rates and the number of terminals 20, 30, and 40 serviced by the base station 10. That is, a transfer rate that makes a cumulative distribution value of the stored burst transfer rates be Z is selected as a temporary transfer rate, and the long-term transfer rate of the target terminal 20 may be estimated by dividing the temporary transfer rate by the number of terminals 20, 30, and 40 serviced by the base station 10.

The third long-term transfer rate calculator 320 should know the number of terminals 20, 30, and 40 serviced by the base station 10 along with the target terminal 20 in order to estimate the long-term transfer rate. That is, the third long-term transfer rate calculator 320 should know information on the number of terminals receiving services provided by the base station 10, and such information may be transmitted from the base station 10.

Figure 7:
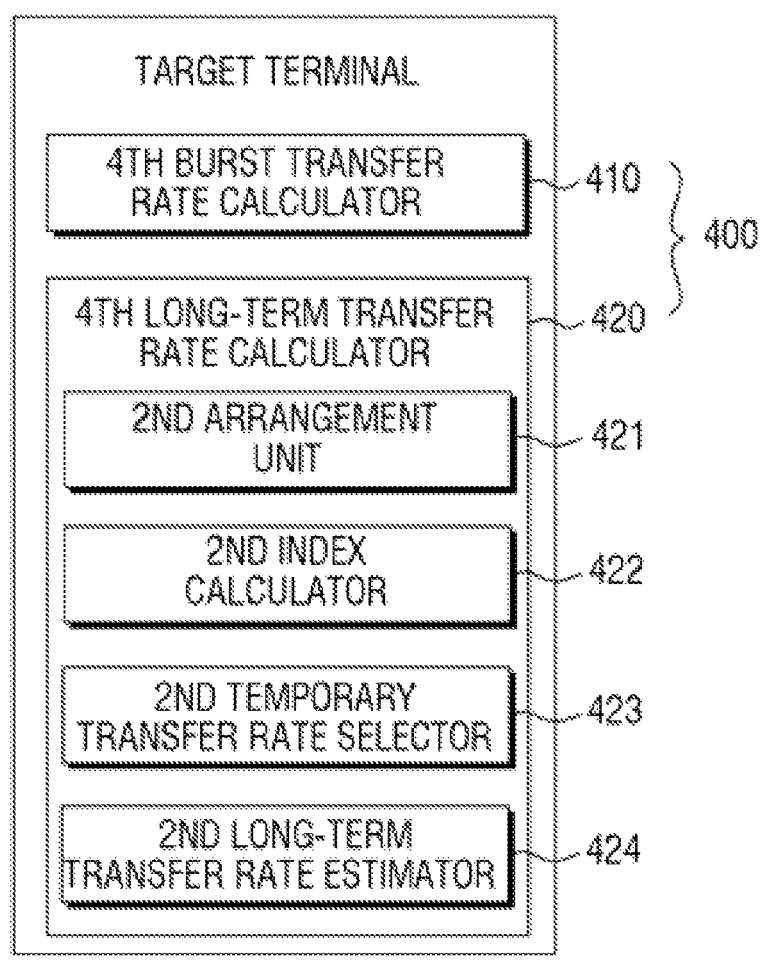
FIG. 7 is a block diagram to explain an apparatus for estimating a long-term transfer rate of a target terminal according to a fourth exemplary embodiment.

FIG. 7 is a block diagram illustrating an apparatus 400 for estimating a long-term transfer rate of the target terminal 20 according to a fourth exemplary embodiment.

Referring to FIG. 7, the apparatus 400 for estimating the long-term transfer rate of the target terminal 20 includes a fourth burst transfer rate calculator 410 and a fourth long-term transfer rate calculator 420. The fourth long-term transfer rate calculator 420 includes a second arrangement unit 421, a second index calculator 422, a second temporary transfer rate selector 423, and a second long-term transfer rate estimator 424. The fourth burst transfer rate calculator 410, the second arrangement unit 421, the second index calculator 422, the second temporary transfer rate selector 423, and the second long-term transfer rate estimator 424 shown in FIG. 7 are the same as or similar to the second burst transfer rate calculator 210, the first arrangement unit 221, the first index calculator 222, the first temporary transfer rate selector 223, and the first long-term transfer rate estimator 224, and thus a detailed description thereof is omitted. However, the second arrangement unit 421, the second index calculator 422, the second temporary transfer rate selector 423, and the second long-term transfer rate estimator 424 shown in FIG. 7 are located in the target terminal 20, whereas the first arrangement unit 221, the first index calculator 222, the first temporary transfer rate selector 223, and the first long-term transfer rate estimator 224 shown in FIG. 4 are disposed in the base station 10.

Therefore, the fourth burst transfer rate calculator 410 is located in the target terminal 20 and calculates burst transfer rates based on pilot signals which are received from the base station for a predetermined time.

The second arrangement unit 421 re-arranges the calculated burst transfer rates in an ascending order and maps index numbers onto the re-arranged burst transfer rates from 1. In this example, the calculated burst transfer rates are re-arranged in the ascending order. However, this is merely an example and it should be understood by an ordinary skilled person the related art that the present disclosure is not limited to this.

The second index calculator 422 calculates an index number for selecting a temporary transfer rate by applying the number of terminals 20, 30, and 40 linked with the base station 10 simultaneously and serviced by the base station 10 and the number of burst transfer rates calculated for the predetermined time to [Equation 3].

The second temporary transfer rate selector 423 selects a burst transfer rate that is mapped onto the index number calculated by the second index calculator 422 from among the rearranged burst transfer rates as a temporary transfer rate. That is, the second temporary transfer rate selector 423 selects the $\lceil Z \times N_{TS} \rceil$th burst transfer rate from among the re-arranged burst transfer rates as the temporary transfer rate.

The second long-term transfer rate estimator 424 estimates a long-term transfer rate of the target terminal 20 using [Equation 5]. That is, the second long-term transfer rate estimator 424 estimates or calculates the long-term transfer rate of the target terminal 20 by dividing the temporary transfer rate selected by the second temporary transfer rate selector 423 by the number of terminals 20, 30, and 40 linked with the base station 10 simultaneously.

Although not shown in FIGS. 6 and 7, the target terminal 20 may further include a receiver (not shown) to receive information on the number of terminals that is received from the base station 10, and the receiver may receive the pilot signals from the base station 10.

Figure 8:
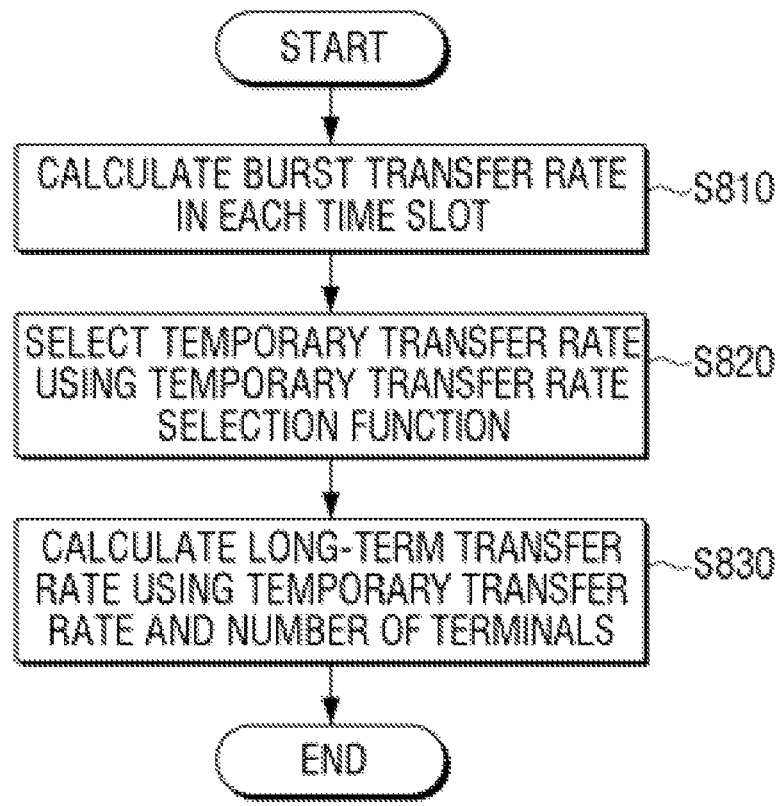
FIG. 8 is a flowchart illustrating a method for estimating a long-term transfer rate of a terminal according to a first exemplary embodiment.

FIG. 8 is a flowchart to explain a method for estimating a long-term transfer rate of a terminal according to a first exemplar embodiment.

An apparatus for performing the method for estimating the long-term transfer rate of the terminal shown in FIG. 8 may be one of the apparatuses 100, 200, 300, and 400 for estimating the long-term transfer rate described above with reference to FIGS. 2, 4, 7, 8, and 11.

Referring to FIG. 8, the apparatus for estimating the long-term transfer rate of the terminal calculates burst transfer rates of pilot signals which are received from a base station for a predetermined time (S810). For example, if the predetermined time consists of one or more time slots, the burst transfer rate is calculated in each time slot. To achieve this, the base station may transmit the pilot signals to the terminal in each time slot of the predetermined time.

According to an exemplary embodiment, if a plurality of terminals is linked with the base station simultaneously, the base station provides service to one terminal in one time slot and simultaneously transmits pilot signals to the plurality of terminals. In this case, the plurality of terminals linked with the base station calculates burst transfer rates of pilot signals. Hereinafter, one of the plurality of terminals (hereinafter, will be referred to as a target terminal) will be explained by way of an example.

The apparatus for estimating the long-term transfer rate of the terminal calculates the burst transfer rate for each of the pilot signals which are received for the predetermined time, and selects a temporary transfer rate from among the calculated burst transfer rates using a temporary transfer rate selection function (S820).

In operation S820, the apparatus for estimating the long-term transfer rate of the terminal may use a temporary transfer rate selection function defined in [Equation 2]. The temporary transfer rate selection function in [Equation 2] is an inverse function of a cumulative distribution function of the burst transfer rates which are calculated in every time slot, and the apparatus for estimating the long-term transfer rate of the terminal selects a burst transfer rate that makes a resulting value of the cumulative distribution function be Z as the temporary transfer rate. The inverse function of the cumulative distribution function is merely an example for selecting a temporary transfer rate and it should be understood that the present disclosure is not limited to such a function.

The apparatus for estimating the long-term transfer rate of the terminal estimates or calculates a long-term transfer rate of the target terminal by dividing the temporary transfer rate selected in operation S820 by the number of terminals serviced by the base station (S830).

Figure 9:
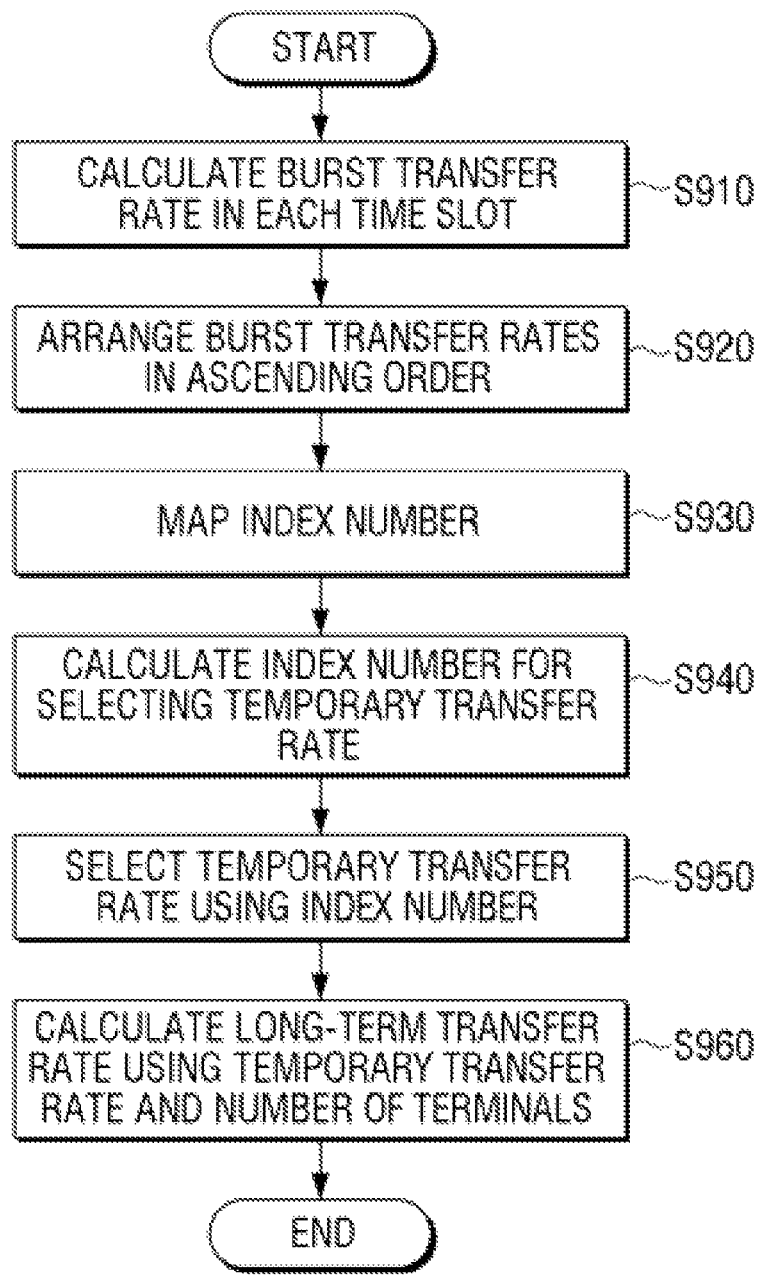
FIG. 9 is a flowchart illustrating a method for estimating a long-term transfer rate of a terminal according to a second exemplary embodiment.

FIG. 9 is a flowchart to explain a method for estimating a long-term transfer rate of a terminal according to a second exemplary embodiment.

An apparatus for performing the method for estimating the long-term transfer rate of the terminal shown in FIG. 9 may be one of the apparatuses 100, 200, 300, and 400 for estimating the long-term transfer rate described above with reference to FIGS. 2, 4, 7, 8, and 11.

Referring to FIG. 9, the apparatus for estimating the long-term transfer rate of the terminal calculates burst transfer rates of pilot signals which are received from the base station for a predetermined time (S910). Operation S910 is the same as operation S810.

If the burst transfer rates of the pilot signals received for the predetermined time are calculated, the apparatus for estimating the long-term transfer rate of the terminal re-arranges the burst transfer rates in a predetermined order (for example, an ascending or descending order) (S920).

The apparatus for estimating the long-term transfer rate of the terminal maps index numbers onto the burst transfer rates re-arranged in the ascending or descending order in sequence (S930).

The apparatus for estimating the long-term transfer rate of the terminal calculates an index number for selecting a temporary transfer rate using i) the number of terminals serviced by the base station and ii) the number of burst transfer rates calculated for the predetermined time (S940). The number of time slots used in operation S940 corresponds to the number of burst transfer rates calculated for the predetermined time in operation S910. The apparatus for estimating the long-term transfer rate of the terminal may calculate the index number using [Equation 3].

The apparatus for estimating the long-term transfer rate of the terminal selects one of the burst transfer rates re-arranged in the predetermined order (ascending or descending order) as a temporary transfer rate, using the index number calculated in operation S940 (S950). If the calculated index number is 3, the apparatus for estimating the long-term transfer rate of the terminal selects the third burst transfer rate from among the re-arranged burst transfer rates as the temporary transfer rate in operation S950.

The apparatus for estimating the long-term transfer rate of the terminal estimates a long-term transfer rate of the target terminal using i) the temporary transfer rate selected in operation S950 and ii) the number of terminals linked with the base station (S960). In operation S960, the apparatus for estimating the long-term transfer rate of the terminal may estimate the long-term transfer rate using [Equation 5]. That is, the apparatus for estimating the long-term transfer rate of the terminal selects the burst transfer rate that is mapped onto the $\lceil Z \times N_{TS} \rceil$th index from among the re-arranged burst transfer rates as the temporary transfer rate, and estimates the long-term transfer rate of the target terminal by dividing the selected temporary transfer rate by the number of terminals.

Operations S920 to S950 in the second exemplary embodiment described above with reference to FIG. 9 may be different from operation S820 or may be a detailed example of operation S820.

According to the exemplary embodiments of FIGS. 8 and 9, as the number of terminals linked with the base station simultaneously increases, the apparatus for estimating the long-term transfer rate of the terminal selects a great burst transfer rate from among the burst transfer rates calculated in the target terminal as the temporary transfer rate. As a result, as the number of terminals linked with the base station simultaneously increases, the calculated long-term transfer rate increases.

Figure 10:
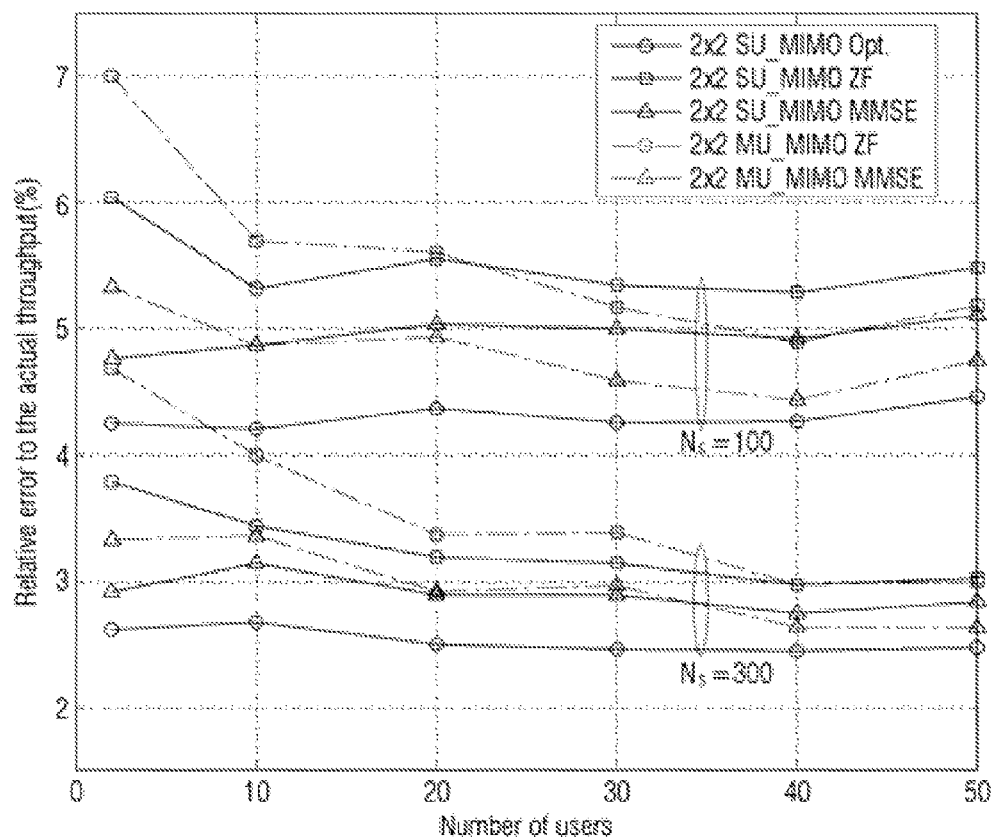
FIG. 10 is a graph showing an error in estimating a long-term transfer rate according to the number of terminals if an apparatus for estimating a long-term transfer rate according to an exemplary embodiment is used.

FIG. 10 is a graph showing an error in estimating a long-term transfer rate according to the number of terminals if an apparatus for estimating a long-term transfer rate according to an exemplary embodiment is used.

Referring to FIG. 10, Ns is the number of time slots used to estimate a long-term transfer rate (that is, the number of calculated burst transfer rates or a greatest value of index numbers mapped onto the burst transfer rates), 2×2 SU-MIMO indicates that two antennas are used by the base station 20 and each terminal 20, 30, and 40 and also indicates a single user method in which all data is transmitted to a single terminal, and 2×2 MU-MIMO indicates a multi-user method in which data may be transmitted to the other terminals. Opt., ZF, and MMSE indicate results when an optimal receiver, a zero-forcing (ZF) receiver, and a minimum mean squared error (MMSE) receiver are used in each terminal 20, 30, and 40, respectively.

As shown in FIG. 10, if Ns=100, an error in estimating the long-term transfer rate is less than or equal to 6%, and, if Ns=300, an error in estimating the long-term transfer rate is less than or equal to 4%. That is, the error is greatly reduced in comparison with that of the related-art. Also, it can be seen that the error decreases as the number of time slots used for estimating the long-term transfer rate increases.

Figure 11A:
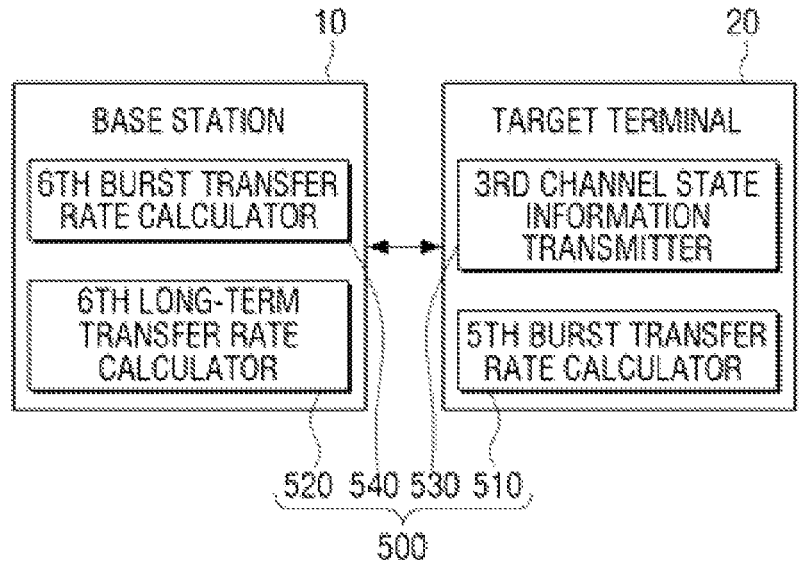
Figure 11B:
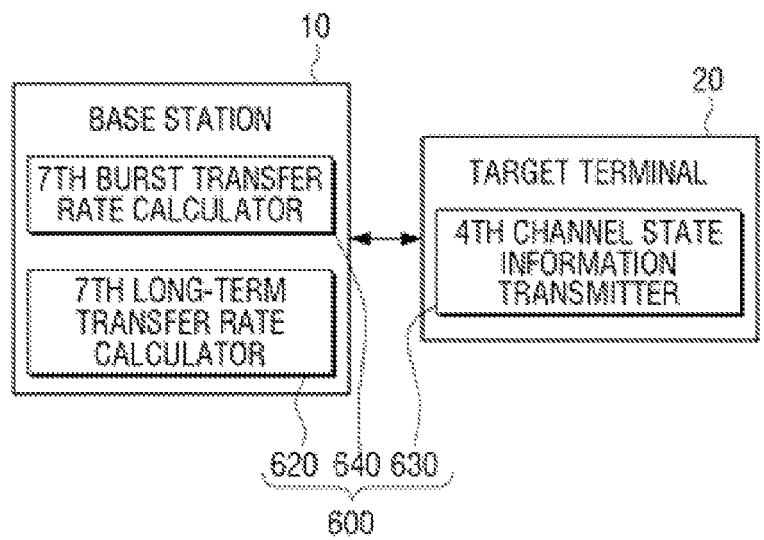

FIG. 11A is a view to explain a long-term transfer rate estimating apparatus 500 according to a fifth exemplary embodiment, and FIG. 11B is a view to explain a long-term transfer rate estimating apparatus 600 according to a sixth exemplary embodiment.

Referring to FIG. 11A, the long-term transfer rate estimating apparatus 500 for estimating the long-term transfer rate of the target terminal 20 includes a fifth burst transfer rate calculator 510, a sixth long-term transfer rate calculator 520, a third channel state information transmitter 530, and a sixth burst transfer rate calculator 540. The fifth burst transfer rate calculator 510 may be located in the target terminal 20. The sixth burst transfer rate calculator 540 and the sixth long-term transfer rate calculator 520 may be located in the base station 10.

The third channel state transmitter 530 included in the terminal 20 may transmit burst transfer rates calculated by the fifth burst transfer rate calculator 510 to the base station 10 as channel state information. The burst transfer rates may be calculated by the fifth burst transfer rate calculator 510 based on pilot signals received by the terminal 20 from the base station 10, as described above with reference to other drawings. The process of calculating the burst transfer rates is the same as or similar to those in the above-described exemplary embodiments, and thus a detailed description thereof is omitted.

The channel state information transmitted by the channel state transmitter 530 may include at least one of the burst transfer rate calculated based on the pilot signal by the fifth burst transfer rate calculator 510, and information for calculating the burst transfer rate calculated based on the pilot signal by the fifth burst transfer rate calculator 510.

Referring to FIG. 11A, the sixth burst transfer rate calculator 540 included in the base station 10 may calculate a burst transfer rate based on the information for calculating the burst transfer rate that is included in the channel state information. If the channel state information transmitted from the terminal 20 does not include the information for calculating the burst transfer rate and includes the burst transfer rate, the sixth burst transfer rate calculator 540 is not required to calculate the burst transfer rate.

The sixth long-term transfer rate calculator 520 may calculate a long-term transfer rate based on the burst transfer rates which are calculated by the sixth burst transfer rate calculator 540 or the burst transfer rates included in the channel state information which is transmitted from the terminal 10. The operation of calculating the long-term transfer rate by the sixth long-term transfer rate calculator 520 (for example, using a temporary transfer rate selection function) is the same as or similar to those of the above-described exemplary embodiments and thus a detailed description thereof is omitted.

Referring to view FIG. 11B, the long-term transfer rate estimating apparatus 600 for estimating the long-term transfer rate of the target terminal 20 includes a seventh long-term transfer rate calculator 620, a fourth channel state information transmitter 630, and a seventh burst transfer rate calculator 640. The calculators 620 and 640 may be located in the base station 10 and the channel state information transmitter 630 may be located in the terminal 20.

Referring to FIG. 11B, the fourth channel state information transmitter 630 included in the terminal 20 may transmit information for calculating burst transfer rates to the base station 10. The information for calculating the burst transfer rates that is transmitted by the fourth channel state information transmitter 630 may be information that is obtained based on pilot signals transmitted from the base station 10. The channel state information transmitter 630 or a separate element of the terminal 20 may configure the information for calculating the burst transfer rates based on the pilot signals.

Referring to FIG. 11B, the seventh burst transfer rate calculator 640 included in the base station 10 may calculate burst transfer rates based on the channel state information.

The seventh long-term transfer rate calculator 620 may calculate a long-term transfer rate based on the burst transfer rates calculated by the seventh burst transfer rate calculator 640. The operation of calculating the long-term transfer rate by the seventh long-term transfer rate calculator 620 (for example, using a temporary transfer rate selection function) is the same as or similar to those of the above-described exemplary embodiments and thus a detailed description thereof is omitted.

Figure 12:
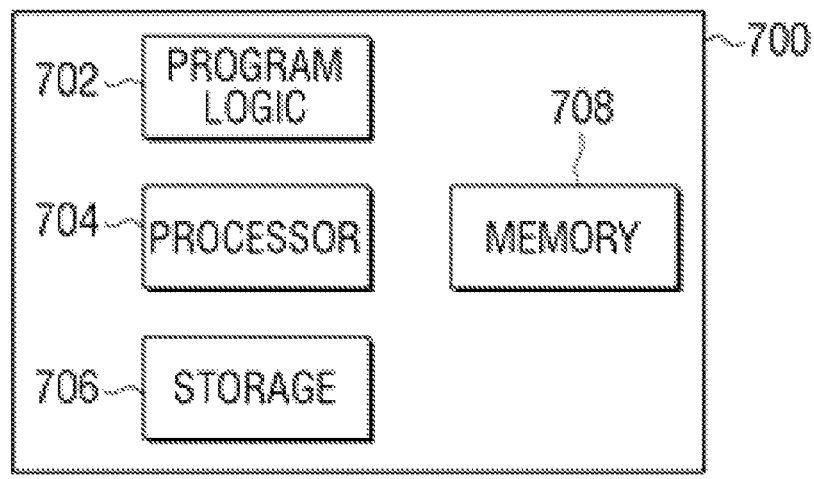
FIG. 12 is a view to explain an example of a computer system in which an apparatus for estimating a long-term transfer rate is embodied according to one or more exemplary embodiments.

FIG. 12 is a view to explain an example of a computer system in which a long-term transfer rate estimating apparatus according to an exemplary embodiment is embodied.

For example, the long-term transfer rate calculator and the burst transfer rate calculator of the above-described exemplary embodiments may be embodied in an apparatus such as a computer system of FIG. 12.

In the computer system of FIG. 12, the burst transfer rate calculator or the long-term transfer rate calculator described above with reference to FIGS. 1 to 7 may be embodied, the method for estimating the long-term transfer rate described above with reference to FIGS. 8 and 9, or the long-term transfer rate calculator described above with reference to FIG. 11 may be embodied.

Referring to FIG. 12, the computer system 700 includes a program logic 702, a computer processor 704, a storage 706, and a memory 708.

The program logic 702 may be embodied in a form of a code that is executable in a computer, and may be stored in the storage 706 and may be loaded into the memory 708 under the control of the processor 704.

For example, the program logic 702 may include a code for performing the operation of the long-term transfer rate calculator described above with reference to FIGS. 1 to 7 and FIG. 11, and such a code may be loaded into the memory 708 and operated.

For another example, the program logic 702 may include a code for performing the operation of the burst transfer rate calculator described above with reference to FIGS. 1 to 7 and FIG. 11, and such a code may be loaded into the memory 708 and operated.

For still another example, the program logic 702 may include a code for performing the operation of the long-term transfer rate calculator and the operation of the burst transfer rate calculator described above with reference to FIGS. 1 to 7 and FIG. 11, and such a code may be loaded into the memory 708 and operated.

For still another example, the program logic 702 may include a code for performing the method for calculating the long-term transfer rate described above with reference to FIGS. 8 and 9, and such a code may be loaded into the memory 508 and operated.

The above-described exemplary embodiments are embodied as a program code executable in a computer. However, at least some of the above-described elements may be embodied by a hardware logic.

While exemplary embodiments have been particularly shown and described above, it will be understood by those of ordinary skill in the art that various changes in form and details may be made therein without departing from the spirit and scope of the present invention as defined by the following claims.

What is claimed is:

1. A method for estimating a long-term transfer rate of a terminal, the method comprising:
    calculating a burst transfer rate of each of pilot signals which are transmitted from a base station to a target terminal to calculate a long-term transfer rate; and
    calculating a long-term transfer rate of the target terminal by using a distribution of the calculated burst transfer rates and a number (N) of terminals that are serviced by the base station.

2. The method as claimed in claim 1, wherein the calculating of the long-term transfer rate comprises:
    selecting a temporary transfer rate based on the distribution of the burst transfer rates by using a temporary transfer rate selection function; and
    calculating the long-term transfer rate by dividing the selected temporary transfer rate by the number (N) of terminals.

3. The method as claimed in claim 2, wherein the temporary transfer rate selection function is defined by following equation:

$$\text{temporary transfer rate selection function} = F_{R_A}^{-1}(Z)$$

wherein $R_A$ is a random variable indicating a change in burst transfer rates of a target terminal (A), $F_{R_A}(\cdot)$ is a cumulative distribution function of the random variable ($R_A$), and $F_{R_A}^{-1}(\cdot)$ is an inverse function of $F_{R_A}(\cdot)$,
    wherein the temporary transfer rate selection function is a function that selects a value that makes a cumulative distribution function value of the burst transfer rates be Z, and the Z is a variable that increases in proportion to the number (N) of terminals and has a value ranging from 0 to 1.

4. The method as claimed in claim 2, wherein the selecting comprises:
    re-arranging the calculated burst transfer rates in a predetermined order and mapping index numbers onto the re-arranged burst transfer rates;
    calculating an index number for selecting the temporary transfer rate, by using the number (N) of terminals and a number of calculated burst transfer rates; and selecting a burst transfer rate that is mapped onto the calculated index number from among the re-arranged burst transfer rates as the temporary transfer rate.

5. The method as claimed in claim 4, wherein the calculating of the index number calculates the index number by using following equation:

Index number=$[Z \times N_{TS}]$ wherein $N_{TS}$ is a number of the calculated burst transfer rates or a greatest value of the index number,
wherein Z is defined by following equation:

$$Z = \frac{N}{N+k}$$

wherein k is a variable that varies according to a communication service state between a base station and the target terminal.

6. The method as claimed in claim 1, wherein the calculating of the burst transfer rate and the calculating of the long-term transfer rate are all performed in the base station.

7. The method as claimed in claim 1, wherein the target terminal receives information on the number (N) of terminals serviced by the base station from the base station,
wherein the calculating of the burst transfer rate and the calculating of the long-term transfer rate are all performed in the target terminal.

8. The method as claimed in claim 1, wherein the calculating of the burst transfer rate is performed in the target terminal and the calculating of the long-term transfer rate is performed in the base station by using the burst transfer rates calculated in the target terminal.

9. An apparatus for estimating a long-term transfer rate of a terminal, which comprises a computer processor, a memory, and a program logic which is loaded into the memory and is executable under a control of the computer processor,
wherein the program logic performs the method of claim 1.

10. The apparatus as claimed in claim 9, wherein the calculating of the long-term transfer rate comprises:
selecting a temporary transfer rate based on the distribution of the burst transfer rates by using a temporary transfer rate selection function; and
calculating the long-term transfer rate by dividing the selected temporary transfer rate by the number (N) of terminals.

11. The apparatus as claimed in claim 10, wherein the temporary transfer rate selection function is defined by following equation:

temporary transfer rate selection function=$F_{R_A}^{-1}(Z)$ wherein $R_A$ is a random variable indicating a change in burst transfer rates of a target terminal (A), $F_{R_A}(\cdot)$ is a cumulative distribution function of the random variable ($R_A$), and $F_{R_A}^{-1}(\cdot)$ is an inverse function of $F_{R_A}(\cdot)$,
wherein the temporary transfer rate selection function is a function that selects a value that makes a cumulative distribution function value of the burst transfer rates be Z, and the Z is a variable that increases in proportion to the number (N) of terminals and has a value ranging from 0 to 1.

12. The apparatus as claimed in claim 10, wherein the selecting comprises:
re-arranging the calculated burst transfer rates in a predetermined order and mapping index numbers onto the re-arranged burst transfer rates;
calculating an index number for selecting the temporary transfer rate, by using the number (N) of terminals and a number of calculated burst transfer rates; and
selecting a burst transfer rate that is mapped onto the calculated index number from among the re-arranged burst transfer rates as the temporary transfer rate.

13. The apparatus as claimed in claim 12, wherein the calculating of the index number calculates the index number by using following equation:

Index number=$[Z \times N_{TS}]$ wherein $N_{TS}$ is a number of the calculated burst transfer rates or a greatest value of the index number,
wherein Z is defined by following equation:

$$Z = \frac{N}{N+k}$$

wherein k is a variable that varies according to a communication service state between a base station and the target terminal.

14. The apparatus as claimed in claim 9, wherein the calculating of the burst transfer rate and the calculating of the long-term transfer rate are all performed in the base station.

15. An apparatus for estimating a long-term transfer rate of a terminal, the apparatus comprising:
a burst transfer rate calculator which calculates a burst transfer rate of each of pilot signals which are transmitted from a base station to a target terminal to calculate a long-term transfer rate; and
a long-term transfer rate calculator which calculates a long-term transfer rate of the target terminal by using a distribution of the calculated burst transfer rates and a number (N) of terminals that are serviced by the base station.

16. The apparatus as claimed in claim 15, wherein the long-term transfer rate calculator selects a temporary transfer rate based on the distribution of the burst transfer rates calculated by the burst transfer rate calculator by using a temporary transfer rate selection function, and calculates the long-term transfer rate by dividing the selected temporary transfer rate by the number (N) of terminals.

17. The apparatus as claimed in claim 16, wherein the temporary transfer rate selection function is defined by following equation:

temporary transfer rate selection function=$F_{R_A}^{-1}(Z)$ wherein $R_A$ is a random variable indicating a change in burst transfer rates of a target terminal (A), $F_{R_A}(\cdot)$ is a cumulative distribution function of the random variable ($R_A$), and $F_{R_A}^{-1}(\cdot)$ is an inverse function of $F_{R_A}(\cdot)$,
wherein the temporary transfer rate selection function is a function that selects a value that makes a cumulative distribution function value of the burst transfer rates be Z, and the Z is a variable that increases in proportion to the number (N) of terminals serviced by the base station and has a value ranging from 0 to 1.

18. The apparatus as claimed in claim 16, wherein the long-term transfer rate calculator comprises:
an arrangement unit which re-arranges the calculated burst transfer rates in a predetermined order and maps index numbers onto the re-arranged burst transfer rates;
an index calculator which calculates an index number for selecting the temporary transfer rate, by using the number (N) of terminals and a number of calculated burst transfer rates; and a temporary transfer rate selector which selects a burst transfer rate that is mapped onto the calculated index number from among the re-arranged burst transfer rates as the temporary transfer rate.

19. The apparatus as claimed in claim 18, wherein the index calculator calculates the index number by using following equation:

$$\text{Index number} = [Z \times N_{TS}]$$

wherein $N_{TS}$ is a number of burst transfer rates calculated by the burst transfer rate calculator or a greatest value of the index number, wherein Z is defined by following equation:

$$Z = \frac{N}{N+k}$$

wherein k is a variable that varies according to a communication service state between the base station and the target terminal.

20. The apparatus as claimed in claim 18, wherein the long-term transfer rate calculator selects a bigger burst transfer rate from among the burst transfer rates as the temporary transfer rate, as the number of terminals increases.

* * * * *